Jan. 13, 1970  C. W. HOUGENDOBLER  3,488,942
PALLET TYPE INDEX SYSTEM
Filed Sept. 20, 1967
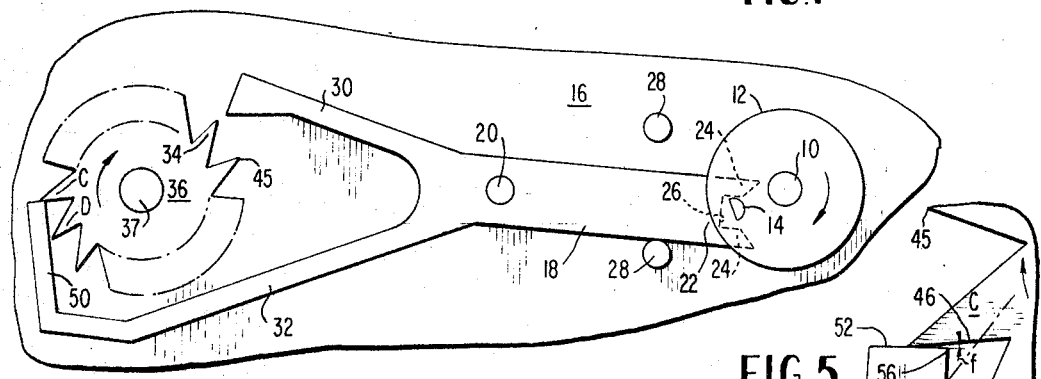
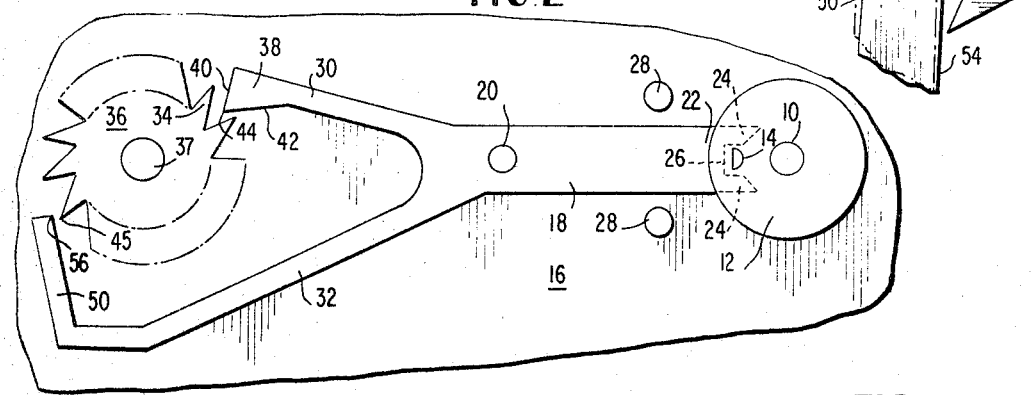
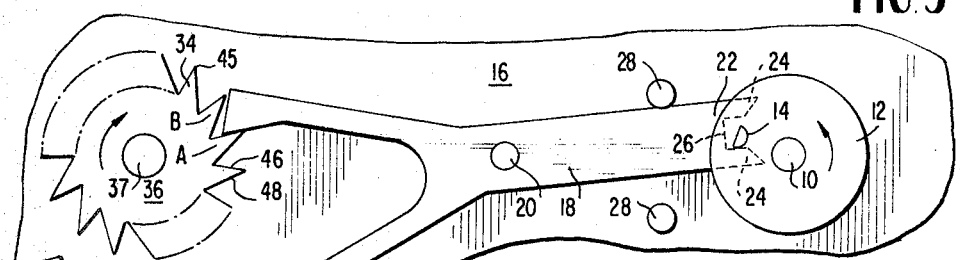
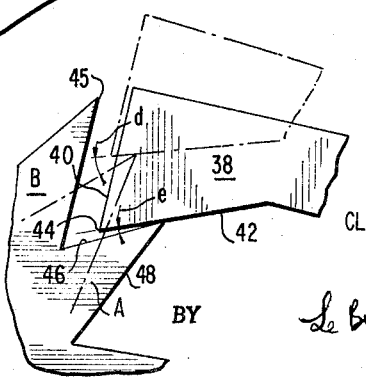
INVENTOR
CLEON W. HOUGENDOBLER
BY LeBlanc & Shur
ATTORNEYS

United States Patent Office 3,488,942
Patented Jan. 13, 1970

3,488,942
PALLET TYPE INDEX SYSTEM
Cleon W. Hougendobler, East Petersburg, Pa., assignor to Hamilton Watch Company, Lancaster, Pa., a corporation of Pennsylvania
Filed Sept. 20, 1967, Ser. No. 669,135
Int. Cl. G04c 3/04
U.S. Cl. 58—28                                6 Claims

ABSTRACT OF THE DISCLOSURE

The index mechanism comprises a pallet pivotally mounted on a pallet plate and rocked by an oscillating roller and depending jewel pin which periodically engages within a forked end of the pallet. The opposite end of the pallet has a pair of pallet arms, the tips of which successively engage the teeth on an index wheel to step the latter in a forward direction. The driving action of the pallet arm tips is substantially tangential to the index wheel for each rocking stroke of the pallet. The driving faces of the pallet tips and the trailing faces of the engaged teeth on the index wheel are substantially coplanar at the end of the respective drive strokes.

BACKGROUND OF THE INVENTION

The present invention relates to an index mechanism for a watch and more particularly to an index mechanism of a double acting pallet type wherein both pallet arms successively engage the index wheel substantially tangentially thereto to step the index wheel unidirectionally with minimal energy loss.

In electric watches of the type having an oscillating balance wheel serving to transmit the motive power, it it necessary to provide an index mechanism which will receive the power from the oscillating movement of the balance wheel and transform these oscillations into rotary motion in a single forward direction. Generally speaking, indexing is performed by rocking a pallet about a intermediate pivot or arbor through a roller and roller pin assembly driven from the oscillating balance wheel and engaging one end of the pallet. The opposite end of the pallet periodically engages a toothed index wheel to drive the wheel in step-by-step fashion.

Prior pallet type index mechanisms often comprise a pair of pallet arms carried on the end of the pallet for engaging the index wheel, one of which arms or both successively steps the toothed wheel in a forward direction. The pallet arms of such prior index mechanisms usually engage the index wheel at closely spaced points along the periphery thereof. The driving action of the pallet arms in such prior index mechanisms is accordingly directed along tangents to the arcs swung by the index wheel contacting portions of the respective arms. These tangents extend along chord lines of the index wheel and sometimes almost radially with respect to the index wheel center. The index wheel is therefore stepped by means of camming or sliding action of the pallet arm contact portions along the faces of the teeth on the index wheel.

Moreover, by imparting a chordwise or substantially radial drive force to the index wheel, a component of such drive force acts against the pivotal bearing for the index wheel providing no useful function and, in fact, increasing the frictional resistance of the wheel to rotary motion. Accordingly, since a predetermined force is required to rotate the index wheel and is most efficiently applied tangentially thereto, the necessary force required in chordwise or substantially radial drives is always greater than the predetermined necessary tangential force.

It will be appreciated that the reduction in size of the motive force (battery) necessary to locate the same within a compact electric watch decreases its driving capacity and at a rate far more rapidly than total resistance to watch movement is decreased by a proportionate decrease in size of the movement. For the relatively small electric watches, a given power source must overcome a substantially greater resistance than in a larger electric watch and accordingly a decrease in the total energy necessary to drive the movement is very desirable in order to extend battery life.

The radial or chordwise driving action of the pallet arms of prior index mechanisms and consequent camming and sliding action of the pallet arm contacting portions along the index wheel teeth faces result in high energy loss due to frictional resistance therebetween. Other types of index mechanisms permit the pallet arms to drag along the teeth of the index wheel on the return stroke. This creates additional energy losses due to the frictional contact between the pallet arm and the wheel which must be overcome by the motive force (battery). These energy losses due to friction in the movement are significant factors in the energy requirements of the movement and adversely affect the capacity of the motive force (battery).

SUMMARY OF THE INVENTION

The present index mechanism comprises a pallet having a forked end in which engages the pin of an oscillating roller assembly to impart rocking movement to the pallet. The opposite end of the pallet has a pair of arms extending integrally therefrom terminating in end portions having contact faces, the contact face on each arm alternately engaging the teeth on an index wheel to impart rotary motion in one direction. The arms are arranged so that the contact faces engage the teeth on substantially diametrically opposite sides of the index wheel and impart a drive force thereto substantially tangent to the index wheel on alternate strokes of the pallet whereby frictional losses attendant to the chordwise or radially camming action of the pallet arms along the faces of the teeth which characterizes previous index mechanisms of the pallet type are substantially eliminated.

The force applied by the uniquely configured pallet arms hereof to the index wheel is virtually all useful force as the force direction is tangential and does not have a substantial component in a chordwise or radial direction. Thus, the driving force necessary in the present index system is considerably reduced from that total force necessary to provide both a component in chordwise or radial directions and a tangential force as in previous index mechanisms.

Addtionally, the faces adjacent the contact faces of the pallet arms are cut back to preclude engagement thereof with the next succeeding tooth of the index wheel on the return stroke of the pallet arm. Moreover, the tip of one of the pallet arms engages within the peripheral confines of the index wheel between adjacent teeth thereof before the tip on the other arm withdraws from within the periphery confines of the wheel during each pallet stroke, whereby the index wheel is never completely disengaged from a pallet and reverse motion thereof, if any, is limited to on-half the tooth pitch.

Accordingly, it is a primary object of the present invention to provide an index mechanism of the pallet type for a watch in which the energy required to index the movement is minimal.

It is another object of the present invention to provide an index mechanism of the double acting pallet type for a watch in which the index wheel is stepped for each pallet stroke with a minimum of energy loss.

It is still another object of the present invention to provide a double acting pallet type index mechanism for a watch in which the driving action of each of the pallet arms is virtually tangential to the index wheel.

It is a further object of the present invention to provide a double acting pallet type index mechanism for a watch in which the driving arms of the pallet are configured to clear the tips of the index wheel teeth on their respective return strokes to preclude frictional dragging therealong.

It is still another object of the present invention to provide a double acting pallet type index mechanism for a watch in which radial or chordwise camming and sliding action of the pallet arm contact faces along the faces of the index wheel teeth is substantially eliminated, thereby eliminating the high frictional losses associated therewith.

These and further objects and advantages of the invention will become more apparent upon reference to the following specification, claims, and appended drawings.

DESCRIPTION OF THE DRAWING FIGURES

FIGURE 1 is a plan view of an index mechanism constructed in accordance with the present invention and illustrating the pallet at the end of a driving stroke immediately prior to the return stroke;

FIGURE 2 is a plan view thereof illustrating the pallet in a center position;

FIGURE 3 is a plan view thereof illustrating the pallet at the end of the opposite driving stroke immediately prior to a return stroke;

FIGURE 4 is an enlarged fragmentary view illustrating the initial and final engagement between a pallet arm face and a tooth on the index wheel during advancement of the latter; and FIGURE 5 is an enlarged fragmentary view illustrating the initial and final engagement between the other pallet arm face and a tooth on the index wheel during advancement of the latter.

DESCRIPTION OF THE PREFERRED EMBODIMENT

Referring more particularly to the figures of the drawings, a balance staff 10 carrying an index roller 12 having a depending roller pin 14 is pivotally mounted on a pillar plate 16 in a conventional manner, not shown. Balance staff 10 is driven by a balance wheel, not shown, which may be suitably oscillated in a conventional manner by an electrical motive force, preferably of the type illustrated in U.S. Reissue Patent No. 26,187, the balance wheel oscillating roller 12 in a conventional manner.

A pallet 18 is pivotally mounted on plate 16 as by pallet arbor 20 and has a forked or bifurcated end 22 having spaced legs 24 defining a recess 26 therebetween. Roller pin 14 successively engages within recess 26 on opposite oscillating excursions of index roller 12 to alternately engage opposite legs 24 and rock pallet 18 about pivot 20 in a conventional manner. A pair of banking pins 28 are mounted on plate 16 on opposite sides of pallet 18 between the pivotal axis 20 and forked end 22 thereof. Pins 28 arrest the rocking movement of pallet 18 to one side or the other and may comprise permanent magnets to retain pallet 18 to one side ort he other until roller pin 14 completes its oscillatory excursion in one direction and returns to engage within recess 26 to pivot pallet 18 toward the opposite side and opposite banking pin.

The other end of pallet 18 is formed to comprise integrally extending short and long arms 30 and 32 respectively which alternately engage teeth 34 on index wheel 36 in response to rocking movement of pallet 18 to step index wheel 36 in a single forward direction illustrated by the arrows. Index wheel 36 is pivotally mounted on plate 16 as by shaft 37 and is geared to the watch gear chain by means not shown to drive the latter unidirectionally. Short arm 30 extends toward index wheel 36 and laterally at an angle to one side of a centerline intersecting the axes of rotation of index wheel 36 and pallet 18. Arm 30 terminates in an inwardly extending enlarged projection 38 having end and side faces 40 and 42 respectively converging to form a tip 44. As seen in FIGURES 3 and 4 projection 38 extends between adjacent teeth 34 of index wheel 36 when arm 30 drives wheel 36 with the tip 45 of the engaged tooth A bearing against inner face 42 and the tip 45 of the following tooth B spaced from the end face 40. For reasons as will presently become clear, the trailing faces 46 of teeth 34 extend radially of wheel 36 while the forward faces 48 of teeth 34 are cut back at a sharp angle. It will be noted that when pallet 18 is fully pivoted against banking pin 28 as seen in FIGURE 3, the inner face 42 of arm 30 lies very nearly tangential to the rear face 46 and forms a slight angle $e$ with the engaged tooth A.

The other longer arm 32 extends laterally toward index wheel 36 to form a larger angle on the opposite side of the centerline than arm 30 formed therewith, such that arm 32 is spaced from the periphery of wheel 36. An end portion 50 of arm 32 extends inwardly toward the periphery of wheel 36 located on the side thereof substantially diametrically opposite end portion 38 of arm 30. End portion 50 of arm 32 terminates in an end face 52 which, as seen in FIGURES 1 and 5, engages the tips 45 of teeth 34 on index wheel 36. When pallet 18 is completely pivoted and bears against banking pin 28 and arm 32 has completed its index wheel driving stroke, it will be seen that end face 52 very nearly parallels the trailing face 46 of the engaged tooth A with an incremental angle $f$ opening inwardly therebetween. The end face 52 on arm 32 and the side face 42 on arm 30 lie in spaced substantially parallel planes. End portion 50 of arm 32 is formed such that inner face 54 is spaced from the tip 45 of the next tooth B when arm 32 has completed its driving stroke.

In use, as balance staff 10 and index roller 12 oscillate in a clockwise direction as seen in FIGURE 1, roller pin 14 enters recess 26 and engages leg 24 to pivot pallet 18 in a counterclockwise direction about pallet axis 20. As pallet 18 swings counterclockwise past the center position seen in FIGURE 2, tip 44 of end projection 38 enters between the rear face 46 and the forward face 48 of adjacent teeth and, as seen in FIGURE 3 and upon further clockwise movement of pallet 18, inner face 42 engages against the tip 45 of tooth A to advance index wheel 36 a distance equal to one-half the tooth pitch. It will be seen that the initial contact between the driven tooth A and end projection 38 is an engagement of tip 45 of tooth A against inner surface 42 with the latter surface and the trailing face 46 of the engaged tooth A forming small inwardly opening angle $d$. As tooth A is advanced by arm 30, angle $d$ becomes progressively smaller until only the incremental angle $e$ remains at which position pallet 18 is fully pivoted against the upper banking pin 28 as seen in FIGURE 3. With this configuration, the driving action imparted to wheel 36 by arm 30 is substantially tangential to wheel 36 throughout the full range of rotation equaling one-half the tooth pitch.

At the completion of the clockwise power stroke of pallet 18, index pin 14 rotates from within recess 26 to complete its counterclockwise oscillatory excursion whereupon the direction of rotation of the balance wheel is reversed and roller pin 14 rotates in the counterclockwise direction as seen in FIGURE 3 to engage within recess 26 against leg 24 to pivot pallet 18 in the clockwise direction. Arm 30 accordingly pivots about axis 20 to withdraw end projection 38 from between the driven and succeeding teeth A and B respectively and, in this connection, it will be noted that end face 40 is cut back at such an angle as to clear the tip 45 of succeeding tooth B. Continued clockwise motion of pallet 18 completely withdraws end portion 38 from between adjacent teeth A and B such that tip 44 is located outwardly of the periphery of wheel 36 while simultaneously the terminal portion of end portion 50 of arm 32 enters between the next driven tooth C and succeeding tooth D. End face 52 engages against the tip 45 of tooth C to step wheel 36 a distance equal to one-half the tooth pitch. The initial contact between end face 52 and the tip of tooth C provides a small angle $g$ opening inwardly which progressively closes to an incremental angle $f$ at the end of the clockwise indexing stroke of arm 32. The driving action between end face 52 and driven tooth C is accordingly substantially tangential of wheel 36 throughout the full range of the half-tooth pitch advance. At the completion of this power stroke and with pallet 18 being retained to one side by the lower of the banking pins 28 as seen in FIGURE 1, roller pin 14 continues to rotate counterclockwise to complete its counterclockwise oscillatory excursion, whereupon the direction of rotation is again reversed by the balance wheel and roller pin 14 rotates to engage within recess 26 against leg 24 to pivot pallet 18 counterclockwise. Counterclockwise movement of pallet 18 withdraws the terminal portion of end portion 50 from between driven tooth C and succeeding tooth D.

It will be noted that inner face 54 of end portion 50 is configured to clear the tip 45 of the succeeding tooth D upon wtihdrawing motion of pallet arm 32. As the tip 56 of end portion 50 is withdrawn beyond the periphery of wheel 36, the tip 44 of end projection 38 on arm 32 has already entered within the peripheral confines of wheel 36 between the trailing face 46 of the next tooth and the forward face 48 of a succeeding tooth. In this manner, the index wheel 36 is never completely disengaged from the pallet arms 30 and 32 even when pallet 18 is located in the center position shown in FIGURE 2.

In a preferred embodiment, index wheel 36 is formed with 15 teeth spaced 24° apart providing an advance of 12° for each pallet stroke. With this arrangement, the initial contact between one of the arms and a tooth is diametrically opposite to the contact of the other arm and its driven tooth at the end of the drive stroke of the latter arm. The distance from the index wheel axis 37 to the pallet axis 20 is .1775 inch and the total angular displacement of pallet 18 is 10°. The angles $d$ and $g$ at initial contact between respective pallet arm faces 42 and 52 and the trailing edges 46 of the engaged teeth are 24° and 14.5° respectively. The angles $e$ and $f$ at the completion of the pallet stroke between respective faces 42 and 52 and the trailing edges 46 of the engaged teeth are 7° and 4° respectively. The pallet faces 42 and 52 may have synthetic jewel inserts to further reduce friction if a metal wheel is employed or a self-lubricating plastic wheel may be employed if the pallet is metal.

It is significant that the contact between the tips 45 of the engaged teeth and faces 42 and 52 of arms 30 and 32 respectively remains substantially fixed along the respective faces and imparts a substantially tangential force to wheel 36 whereby the chordwise or radial camming action of opposed teeth and contact faces which characterizes prior art index mechanisms is substantially eliminated. Thus, the frictional loss previously occasioned by the sliding action between opposed pallet and tooth faces in prior index mechanisms has been substantially eliminated and the motive force required to drive the present index mechanism is considerably less than heretofore thought possible.

It is also significant that pallet arms 30 and 32 engage teeth 34 on diametrically opposite sides of index wheel 36. In this manner, a double acting pallet provided in which the index wheel is positively advanced for each stroke of pallet 18. Moreover, by such configuration, the driving action of the respective arms operates substantially tangentially with respect to the wheel on each pallet stroke, thus substantially eliminating the camming and sliding action between the contact arms and teeth and the attendant frictional losses caused thereby as in prior index mechanisms. Additionally, the frictional losses occasioned by index mechanisms of prior art wherein the pallet arms drag along the index wheel on the return stroke of the pallet are completely eliminated as the contacting and advance end faces of arms 30 and 32 are configured such that they are spaced from and clear the wheel on their return strokes.

What is claimed and desired to be secured by United States Letters Patent is:

1. An index mechanism for driving the gear train of a watch comprising a pallet mounted for rocking movement, means for imparting rocking movement to said pallet, an index wheel having peripheral teeth and adapted to drive the gear train of a watch, said pallet having a pair of arms and a contact portion carried by each arm, said contact portions alternately engaging said teeth to impart a force substantially tangentially of said wheel in response to rocking movement of said pallet to rotate said index wheel unidirectionally, one of said pallet arms lying on one side of a straight line intersecting the pivotal axis of said wheel and said pallet, the other of said arms lying on the other side of said straight line, said contact portions lying on substantially diametrically opposite sides of said index wheel, said one arm being spaced outwardly of the periphery of said wheel and extending from the pallet through a straight line normal to and intersecting the first mentioned straight line and the axis of rotation of said wheel, said pallet arm having an end portion including the contact portion thereof extending beyond said second mentioned straight line and inwardly toward the periphery of said wheel to intersect the same on the side thereof substantially diametrically opposite the contact portion on said other arm, said arms extending from an end of said pallet, said pallet having a forked opposite end, said rocking means including an oscillating balance staff and a roller having a roller pin alternately engaging with said forked end on opposite oscillations of said roller to rock said pallet.

2. An index mechanism for driving the gear train of a watch comprising a pallet mounted for rocking movement, means for imparting rocking movement to said pallet, an index wheel having a peripheral teeth and adapted to drive the gear train of a watch, said pallet having a pair of arms and a contact portion carried by each arm, said contact portions alternately engaging said teeth to impart a force substantially tangentially of said wheel in response to rocking movement of said pallet to rotate said index wheel unidirectionally, the contact portion of one of said arms being spaced from said wheel when the contact portion of the other of said arms lies in engagement with said wheel, said teeth having trailing faces extending substantially radially of said wheel, the leading and trailing faces of said teeth converging to form tips on said teeth, said contact portions comprising contact faces engageable against said tips to form small angles with said trailing faces upon initial engagement therewith during the drive stroke of said pallet, said angles progressively decreasing in magnitude throughout the remainder of the drive stroke such that said contact faces lie very nearly parallel to said trailing faces at the end of the drive stroke.

3. An index mechanism for driving the gear train of a watch comprising a pallet mounted for rocking movement, means for imparting rocking movement to said pallet, an index wheel having peripheral teeth and adapted to drive the gear train of a watch, said pallet having a pair of arms and a contact portion carried by each arm, said contact portions alternately engaging said teeth to impart a force substantially tangentially of said wheel in response to rocking movement of said pallet to rotate said index wheel unidirectionally, the contact portion of one of said arms being spaced from said wheel when the contact portion of the other of said arms lies in engagement with said wheel, said contact portions comprising contact faces formed adjacent terminal portions of said arms and engageable against the tips of said teeth, said faces lying in spaced substantially parallel planes.

4. An index mechanism for driving the gear train of a watch comprising a pallet mounted for rocking movement, means for imparting rocking movement to said pallet, an index wheel having peripheral teeth and adapted to drive the gear train of a watch, said pallet having a pair of arms and a contact portion carried by each arm, said contact portions alternately engaging said teeth to impart a force substantially tangentially of said wheel in response to rocking movement of said pallet to rotate said index wheel unidirectionally, one of said pallet arms lying on one side of a straight line intersecting the pivotal axis of said wheel and said pallet, the other of said arms lying on the other side of said straight line, said contact portions lying on substantially diametrically opposite sides of said index wheel, said one arm being spaced outwardly of the periphery of said wheel and extending from the pallet through a straight line normal to and intersecting the first mentioned straight line and the axis of rotation of said wheel, said pallet arm having an end portion including the contact portion thereof extending beyond said second mentioned straight line and inwardly toward the periphery of said wheel to intersect the same on the side thereof substantially diametrically opposite the contact portion on said other arm, said contact portion on said one arm comprising an end face engageable against the tips of said teeth, the contact portion on the other arm comprising a lateral face on the inner side thereof and engageable against the tips of said teeth, said faces lying in spaced substantially parallel planes.

5. An index mechanism for driving the gear train of a watch comprising a pallet mounted for rocking movement, means for imparting rocking movement to said pallet, an index wheel having peripheral teeth and adapted to drive the gear train of a watch, said pallet having a pair of arms and a contact portion carried by each arm, said contact portions alternately engaging said teeth to impart a force substantially tangentially of said wheel in response to rocking movement of said pallet to rotate said index wheel unidirectionally, one of said pallet arms lying on one side of a straight line intersecting the pviotal axis of said wheel and said pallet, the other of said arms lying on the other side of said straight line, said contact portions lying on substantially diametrically opposite sides of said index wheel, and said contact portions comprising contact faces engageable against the tips of said teeth, said faces lying very nearly parallel to the trailing faces of said teeth at the ends of said drive strokes.

6. An index mechanism according to claim 5 wherein said contact portions are movable between adjacent teeth and within the peripheral confines of said wheel in response to alternate strokes of said pallet, one of said tip portions moving within the peripheral confines of said wheel before the other tip portion moves without the peripheral confines thereof for each pallet stroke whereby either one or the other of said tip portions lies within the peripheral confines of said wheel between adjacent teeth throughout each pallet stroke.

References Cited

UNITED STATES PATENTS

| | | | |
|---|---|---|---|
| 1,070,577 | 8/1913 | Benecke | 58—27 |
| 1,852,992 | 4/1932 | Abegglen. | |
| 2,088,794 | 8/1936 | Kenerson | 58—27 |
| 2,647,362 | 8/1953 | Fidelman | 58—117 |

FOREIGN PATENTS

| | | |
|---|---|---|
| 1,397,862 | 3/1965 | France. |

RICHARD B. WILKINSON, Primary Examiner

GEORGE H. MILLER, Jr., Assistant Examiner

U.S. Cl. X.R.

58—117